United States Patent

[11] 3,575,302

| | | |
|---|---|---|
| [72] | Inventor | Constantine F. Cafolla<br>Waterloo, N.Y. |
| [21] | Appl. No. | 762,530 |
| [22] | Filed | Sept. 25, 1968 |
| [45] | Patented | Apr. 20, 1971 |
| [73] | Assignee | SFM Corporation<br>Union, N.J. |

[54] WORK HANDLING MECHANISM
7 Claims, 13 Drawing Figs.

[52] U.S. Cl. .................................................. 214/1,
214/147
[51] Int. Cl. .................................................. B66c 1/62
[50] Field of Search ........................................ 214/1 (B),
1 (B)2, 1 (B)3, 1 (B)4, 1 (RCM), 147 (T)

[56] References Cited
UNITED STATES PATENTS

| | | | |
|---|---|---|---|
| 3,087,596 | 4/1963 | Fuiton .......................... | 214/1(B3)X |
| 3,097,011 | 7/1963 | Foster .......................... | 294/104 |
| 3,209,922 | 10/1965 | Melvin .......................... | 214/1B4 |
| 3,268,092 | 8/1966 | Hainer .......................... | 214/1(RCM) |
| 3,280,991 | 10/1966 | Melton .......................... | 214/1(RCM) |

FOREIGN PATENTS

| | | | |
|---|---|---|---|
| 641,423 | 12/1963 | Belgium .......................... | 214/1B4 |
| 203,493 | 4/1966 | Sweden .......................... | 214/1(RCM) |

*Primary Examiner*—Gerald M. Forlenza
*Assistant Examiner*—George F. Abraham
*Attorney*—Christel & Bean

ABSTRACT: A crank arm movable in opposite directions about a first axis carries an elevator arm movable with the crank arm about the first axis and movable relative thereto in opposite directions about a second axis. A pair of finger units carried by the elevator arm for movement therewith about the first and second axes and for movement relative thereto in opposite directions about a third axis close and open to engage and release a workpiece. The elevator arm and finger units also are movable as a unit in opposite directions along the second and third axes, respectively, for shifting a workpiece into and out of a chuck.

INVENTOR.
Constantine F. Cafolla
BY
Christel + Bean
ATTORNEYS

INVENTOR.
Constantine F. Cafolla
BY
Christel & Bean
ATTORNEYS

WORK HANDLING MECHANISM

BACKGROUND OF THE INVENTION

This invention relates generally to the work handling art, and more specifically to a new and useful work handling mechanism adapted for use as an automatic loader for machine tools and the like.

In mass production a machine tool can perform a predetermined series of operations on successive workpieces. For example, one lathe can be programmed to turn a shaft of predetermined configuration from rough, cylindrical stock and to repeat the same sequence of operations on successive pieces of stock. However, the finished workpiece must be removed before the succeeding rough stock is inserted in the lathe, and maximum efficiency will not be realized if this is down manually.

Various loading mechanisms are available for delivering stock to a machine and removing finished work therefrom. However, lathes can present special problems. For example, in a tracer lathe using an overhead template support, the workpiece must be removed and be inserted laterally to avoid interference with the template bracket and associated mechanisms. At the same time, where the workpiece is supported in the lathe by steady rests, as often is the case, the work must be loaded and removed from above to avoid interference with the rests.

SUMMARY OF THE INVENTION

A primary object of this invention is to provide an automatic work handler which is movable laterally into and out of position for removal of a finished workpiece from a machine and delivery of rough stock thereto, and which is movable generally vertically to load and unload the machine from that position.

Another object of my invention is to provide the foregoing in a work handler which is operable to shift the workpiece along its axis into and out of engagement with a work holder.

A further object of my invention is to provide a work handler which is operable as aforesaid automatically and in predetermined sequence.

It is also an object of my invention to provide the foregoing in an arrangement characterized by its versatility and efficient use of available space, and which can be swung out of the way for ease of access to the machine.

The foregoing and other objects, advantages and characterizing features of the work handler of this invention will become clearly apparent from the ensuing detailed description of an illustrative embodiment thereof, reference being made to the accompanying drawings depicting the same wherein like reference numerals denote like parts throughout the various views.

BRIEF DESCRIPTION OF THE DRAWING FIGURES

FIGS. 5—13 are schematic illustrations showing sequential positions of the work handler.

DETAILED DESCRIPTION OF THE PREFERRED EMBODIMENT

Figure 5:
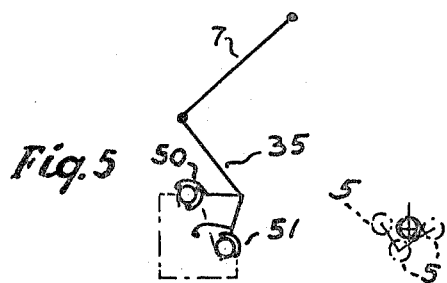
Figure 6:
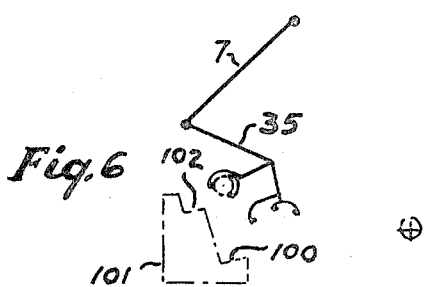
Figure 13:
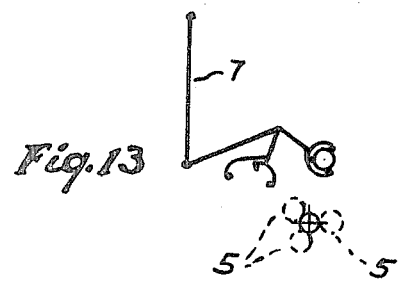

Referring now in detail to the illustrative embodiment depicted in the accompanying drawings, an automatic loader of this invention is shown in conjunction with a tracer lathe having a head stock 1 including a chuck adapted to support a workpiece indicated at 2, a frame 3 and a template bracket 4 (FIG. 2), a steady rest, which can be of the type shown in U.S. Pat. No. 3,234,829 can be provided, as indicated by the workpiece supporting rolls 5, (FIGS. 5 and 13). Such tracer lathes and steady rests, being known, require no further elaboration.

The work handling mechanism of this invention comprises a crank arm 7 journaled on the outer end of a shaft 8 the inner end of which is clamped in brackets 9 and 10 mounted on a body plate 11. Plate 11, and with it the entire loader mechanism, is adapted to be mounted on the machine frame by hinges including hinge brackets 12 secured to the frame and hinge pintles 13 and 14, the former comprising part of bracket 10 and the latter being secured directly to body plate 11. With this arrangement, the loading mechanism can be swung out of the operative position shown in the drawings to provide access to the machine in the head stock area. Normally, however, the work handling mechanism will be latched in the operative position shown in the drawings by latch mechanisms mounted on the machine frame 3 and indicated generally at 15 and 16.

Crank 7 is adapted to be swung in opposite directions about the axis of shaft 8 by a motor comprising an hydraulic cylinder 17 pivotally connected at 18 to a mounting bracket 19 on plate 11. The piston rod of cylinder 17 has a clevis 21 pivotally connected at 22 to an arm 23 bolted to the head end of arm 7 for swinging the same upon extension and retraction of cylinder rod.

An elevator guide bar 25 is mounted on a shaft 26 journaled in the lower end of arm 7 for rotation about the axis of shaft 26. Such movement of elevator guide bar 25 is provided by a motor comprising an hydraulic cylinder 27 pivoted at 28 to a bracket 29 fixed to crank arm 7 for movement therewith. The piston rod 31 of motor 27 is pivoted at 32 to an arm 33 fixed to shaft 26 for rotating the latter in opposite directions upon extension and retraction of piston rod 31.

An elevator arm generally designated 35 and comprising a framework of side rails 36 and cross rails 37 (FIG. 3) is mounted on guide bar 25 for movement therewith about the axis of shaft 26 and for movement relative thereto along that axis. To this end, arm 35 carries pairs of rollers 38 mounted on brackets 39 secured to side rails 36 and engaging the upper surface of guide bar 25. Arm 35 also carries at opposite sides thereof pairs of rollers 40 mounted on brackets 39 and engaging oppositely inclined guide surfaces 41 on the under surface of guide bar 25. Thus, the upper surface of bar 25 and the under surfaces 41 thereof are like the ways of a lathe, guiding elevator arm 35 for movement in opposite directions along the axis of shaft 26. Such movement is accomplished by a motor comprising hydraulic cylinder 43 pivoted at one end to a bracket 45 carried by a side rail 36 of arm 35. Piston rod 46 of cylinder 43 is secured to a bracket 47 mounted on guide bar 25.

A shaft 49 is journaled in the outer ends of side rails 36 of arm 35 and paired finger units, generally designated 50 and 51, are secured to each of the opposite ends of shaft 49 for rotation therewith. Shaft 49 is adapted to be rotated about its axis by a motor comprising an hydraulic cylinder 52 pivotally secured to a bracket 54 carried by arm 35. Piston rod 55 of cylinder 52 is pivotally connected at 56 to an arm 57 secured to shaft 49. Thus, shaft 50, and the attached finger units 50, 51 are rotated in opposite directions about the axis of shaft 49 upon extension and retraction of piston rod 55. The hub of arm 57 and a collar 58 cooperate with the end of the adjacent rail 56 to restrain shaft 49 against endwise movement in elevator arm 35.

Each pair of finger units includes a spider member having a hub 60 fixed to shaft 49. An upper pair of radial arms 61, 62 extend from hub 60, and a lower pair of radial arms 63, 64 also extend therefrom. Each lower arm 63, 64 is generally Y-shaped, having an arcuate extension 65 provided at one with a mechanism 66 for mounting one workpiece engaging finger 67. Extension 65 also has a second mechanism 68 at its opposite end mounting a second finger 69 in 120° relation to finger 67. An arcuate lever 70 is pivoted at 71 to arm 63 and has a mechanism 72 mounting a third finger 73.

Arm 64 is similarly provided with such an extension and lever, and therefore the corresponding parts are correspondingly numbered, except for the use of primes to distinguish between units 50 and 51. The mechanisms 66, 68 and 72 can be clamp brackets, or the work engaging fingers 67, 69 and 73 can be threaded therein and releasably locked in adjusted position as by set screws. In either case, the work engaging fingers are positionally adjustable for centering and to accommodate workpieces 2 of different diameters.

The finger units are opened and closed, to release and engage a workpiece 2, by swinging levers 70, 70' about their respective pivot axes. This is done by motors comprising hydraulic cylinders 74, 74', the cylinder 74 being pivotally connected in similar manner to arm 62. Piston rod 76 of cylinder 74 is pivotally connected to a bracket 77 on lever 70 and piston rod 76' of cylinder 74' is pivotally connected to bracket 77' fixed to lever 70'. Thus, extension and retraction of piston rod 76 will close and open finger unit 51, while extension and retraction of piston rod 76' will open and close finger unit 50.

Hydraulic motors 17, 27, 43, 52, 74 and 74' are activated by pumps and valves under control of interlocked electrical circuits including limit switches actuated upon extension and retraction of the respective motors. In the case of motor 17, arm 23 carries a pair of dogs 80, 81 arranged to engage the actuator 82 of a double throw switch 83 upon extension and retraction, respectively of motor 17. A similar switch 84 has an actuator 85 engaged by similarly arranged dogs 86 on arm 33. Dogs 80, 81 and 86 are positionally adjustable.

Figure 4:
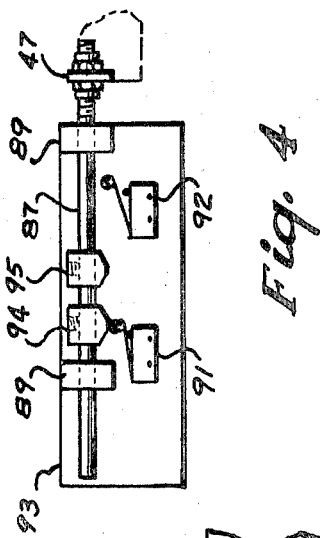
FIG. 4 is an enlarged, fragmentary detail view thereof.
Figure 3:
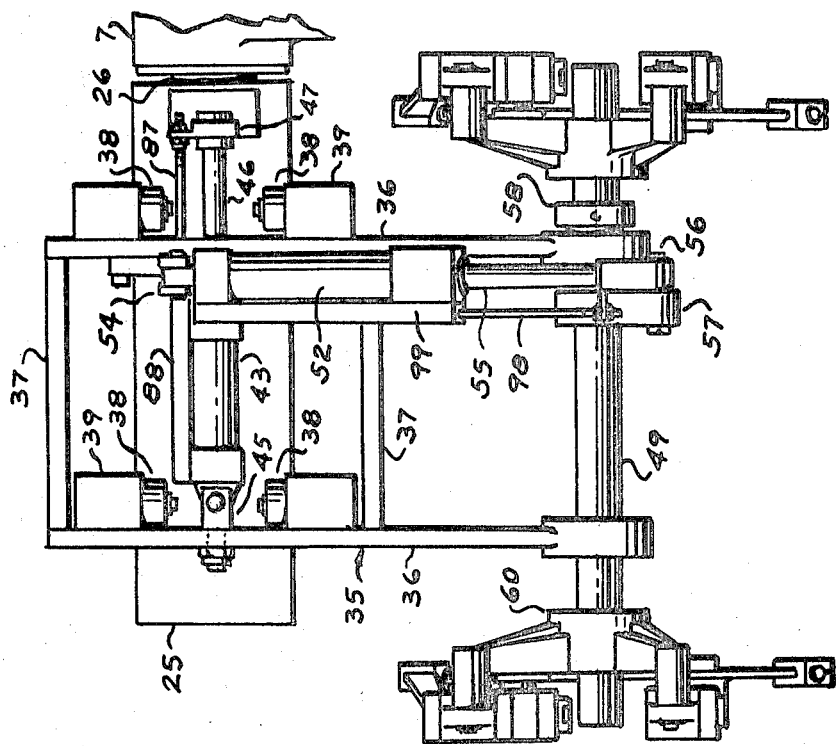
FIG. 3 is a fragmentary top plan view thereof.

In the case of motor 43, a rod 87 is secured to bracket 47, as shown in FIGS. 3 and 4. Rod 87 extends into a switch housing 88 mounted on cylinder 43 (the housing cover being omitted in FIG. 4), in sliding engagement with a pair of support brackets 89. A pair of limit switches 91, 92, which can be microswitches, are mounted on a housing part 93 for engagement by a pair of dogs 94, 95 which are slidably adjustable on rod 87, being held in adjusted position as by set screws.

Motors 52, 74 and 74' have control switch arrangements like that of FIG. 4, motors 74 and 74' being provided with rods 96, 96' connected to the brackets to which piston rods 76, 76' are connected, and extending into switch housings 97, 97'. Motor 52 has a rod 98 connected to the bracket to which piston rod 55 is connected and extending into switch housing 99. Rods 96, 96' and 98 carry adjustable dogs engaging switches within the respective housings, just as in FIG. 4, whereby further illustration and explanation is unnecessary. Only one pair of finger units need be provided with limit switches.

Figure 10:
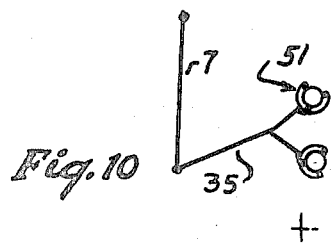

The operation of my work handler is as follows. Starting from the position shown in FIGS. 2 and 8, finger units 51 are about to engage a finished workpiece. Cylinders 74 are extended to effect such engagement. Such extension of cylinder 74 actuates one of their limit switches which is interlocked with the control for motor 43, causing it to be energized in a direction extending the same and shifting elevator arm 35 in a direction to disengage the finished workpiece 2 from the chuck. Arrival of elevator arm 35 in its extended position is signaled by actuation of limit switch 92 which then causes motor 27 to be retracted, swinging elevator arm 35 upwardly to the position shown in FIG. 9. Arrival of elevator arm 35 in its upper position is signaled by actuation of switch 84 which then causes motor 52 to be energized in a direction retracting it and swinging finger units 50, carrying the rough stock, into position above the spindle axis of the lathe as shown in FIG. 10.

Figure 1:
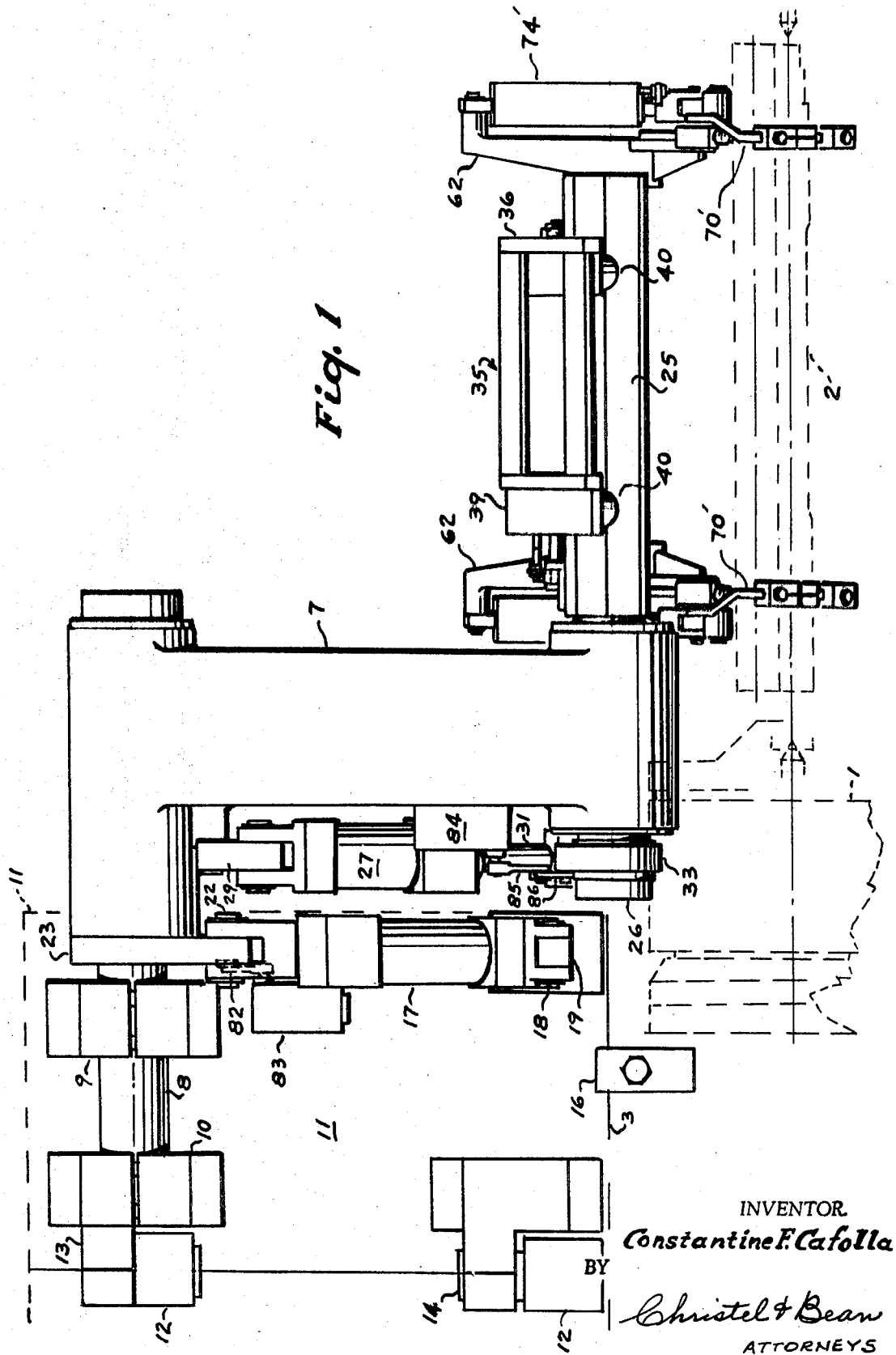
FIG. 1 is a front elevational view of a work handler of my invention mounted on a tracer lathe indicated in broken lines.
Figure 11:
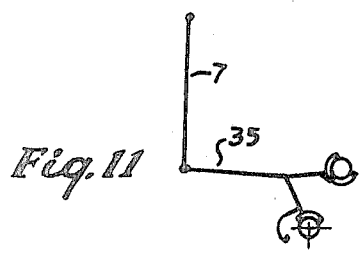
Figure 12:
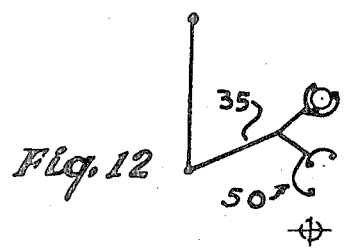

Retraction of motor 52 closes a limit switch signaling the extension of elevator motor 27 to lower elevator arm 35 to the position of FIG. 11 and position the rough stock between steady rest rolls 5. Arrival of elevator arm 35 in its lower position is signaled by actuation of a limit switch in housing 84 which causes motor 43 to be energized in a direction retracting the same to engage the rough stock in the chuck. It will be noted that finger units 51 remain out of the way, during this operation. Arrival of elevator arm 35 in the chuck engaging position is signaled by actuation of limit switch 91 which then causes motor 74' to be energized in a direction extending the same, to open finger units 50 as shown in FIG. 11. With finger units 50 open and the rough stock thereby disengaged, a limit switch in housing 97' is engaged, causing motor 43 to extend. Actuation of switch 92 causes the elevator arm 35 to be raised by motor 27, to the position of FIG. 12. Upon arrival of the elevator arm 35 in its elevated position, signaled by switch 84, motor 52 is extended, shifting the finger units to the position of FIG. 13. This actuates a switch in housing 99, causing crank arm motor 17 to be energized in a direction swinging the entire unit away from the machine to the position of arm 7 shown in FIG. 5. This actuates switch 83, causing energization of motor 27 in a direction extending it and swinging arm 35 to the position shown in FIG. 1, placing finger units 51 with the finished workpiece adjacent a workpiece receiving part 100 of a carriage 101 which also has a rough stock supporting part 102 adjacent which finger units 50 are positioned. Upon arrival of arm 35 in that position switch 84 causes motor 74 and 74' to be actuated to open finger unit 51 and thereby release the finished workpiece, and to close finger unit 50 to engage the rough stock. When this is accomplished, as signaled by limit switches in housings 97, 97', motor 27 is retracted, swinging arm 35 to the position of FIG. 6. The carriage unit 101 then can be moved in any desired manner to deliver the finished workpiece and to pick up another piece of rough stock.

Figure 2:
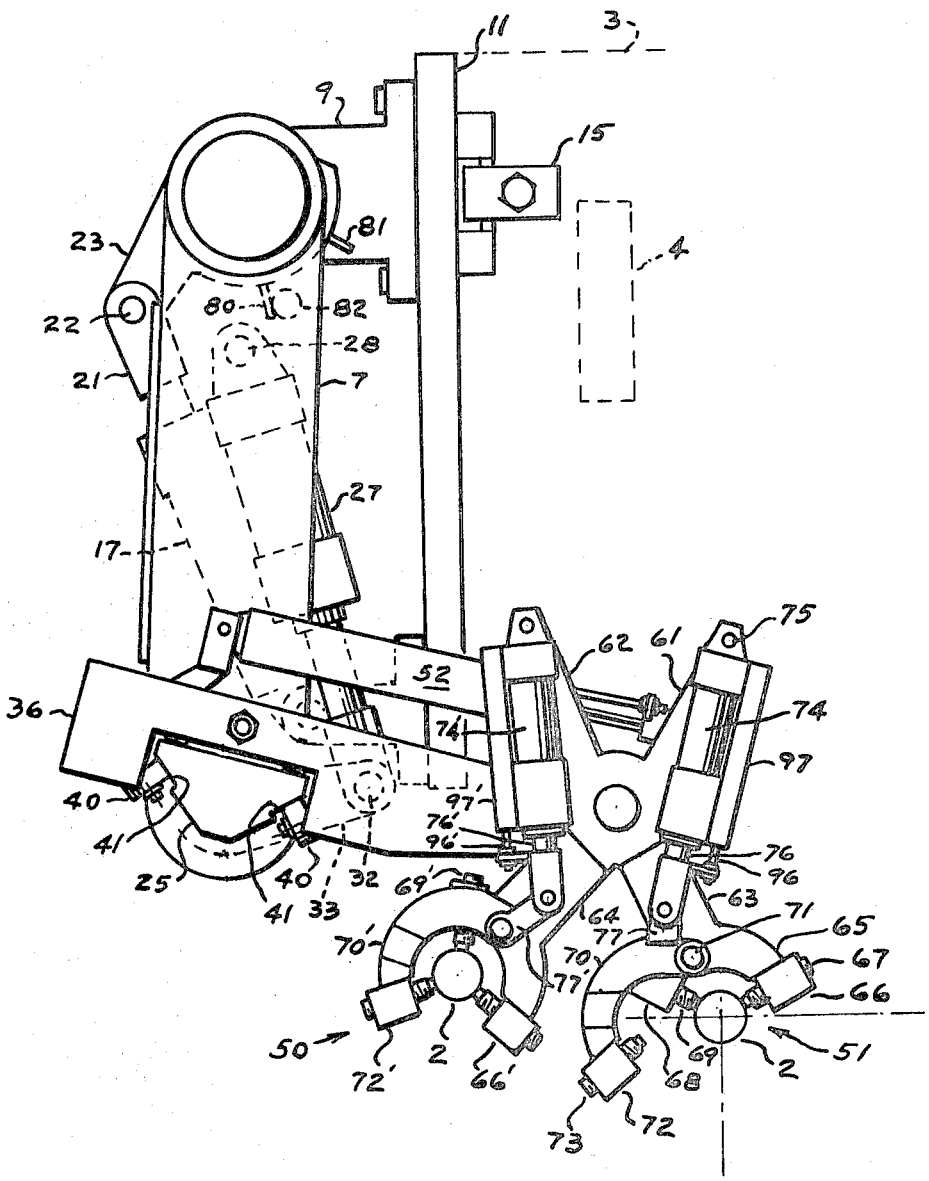
FIG. 2 is an end elevational view thereof.
Figure 7:
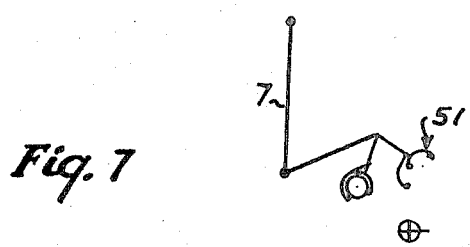
Figure 8:
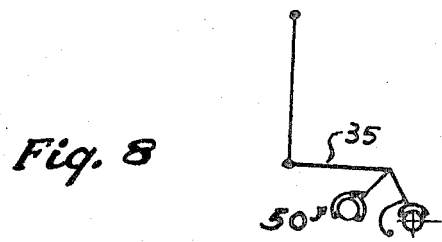
Figure 9:
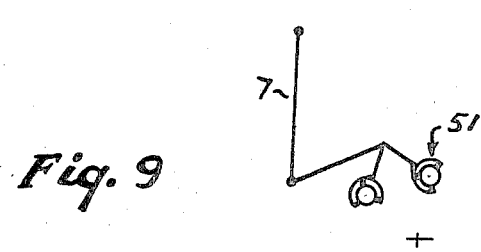

When the machining operation is finished, as signaled by closing of a switch not shown, crank arm motor 17 is energized to swing the mechanism to the loading position adjacent the machine, as shown in FIG. 7, with arm 35 elevated. When crank arm 7 is at that position, signaled by switch 83, elevator motor 27 is energized to lower arm 35 and position finger units 51 adjacent the finished workpiece, as shown in FIGS. 2 and 8. Arrival of arm 35 in that position is signaled by actuation of switch 84, causing finger units 51 to close.

The above described cycle of operation is repeated, automatically, until the main switch, not shown, is opened. The various motions follow a predetermined sequence, and the motor energizing circuits are energized in sequence by the various limit switches in a manner well understood by those skilled in the art. Since the details of such circuits are not a part, per se of my invention, no further description is needed.

Accordingly, it is seen that my invention fully accomplishes its intended objects. The foregoing detailed description is given by way of illustration only, and I intend to include within the scope of the appended claims such variations and modifications as will naturally occur to those skilled in the art.

I claim:

1. A work handling mechanism comprising a crank arm mounted for movement in opposite directions about a first axis, an elevator arm, means mounting said elevator arm on said crank arm for movement therewith about said first axis and for movement relative thereto in opposite directions about a second axis, a pair of finger units carried by said elevator arm for movement therewith about said first and second axes and for movement relative thereto in opposite directions about a third axis, motor means for moving said arms and units about said axes and for opening and closing said units to release and grasp a workpiece, and said mounting means including means mounting said elevator arm for movement in opposite directions along said second and third axes.

2. A work handling mechanism as set forth in claim 1, in combination with a machine adapted to work on the workpieces handled by said mechanism, and hinge means mounting said mechanism on said machine for swinging movement into and out of loading position relative thereto.

3. A work handling mechanism as set forth in claim 1, wherein two pairs of said finger units are carried by said elevator arm.

4. A work handling mechanism as set forth in claim 1, wherein said motor means comprise hydraulic cylinders, together with control means therefor including limit switches actuated by extension and retraction of said cylinders.

5. A work handling mechanism as set forth in claim 1, wherein said mounting means includes a guide bar journaled in said crank arm, and rollers carried by said elevator arm in guided engagement with said bar.

6. A work handling mechanism as set forth in claim 1, wherein each of said units includes a somewhat Y-shaped arm carrying a pair of workpiece engaging elements spaced apart 120°, and a lever pivoted to said arm and carrying a third workpiece engaging element movable into and out of workpiece engaging position in 120° spaced relation to said pair of elements.

7. A work handling mechanism as set forth in claim 1, together with control means actuated upon movement of at least certain of said motor means, said control means including pair limit switches and actuating dogs therefor connected to an associated one of said motor means for movement therewith.